P. CROSLEY, Jr.
VULCANIZER.
APPLICATION FILED MAR. 22, 1920.

1,393,091.

Patented Oct. 11, 1921.
2 SHEETS—SHEET 1.

INVENTOR.
Powel Crosley Jr.
BY James N. Ramsey
ATTORNEY

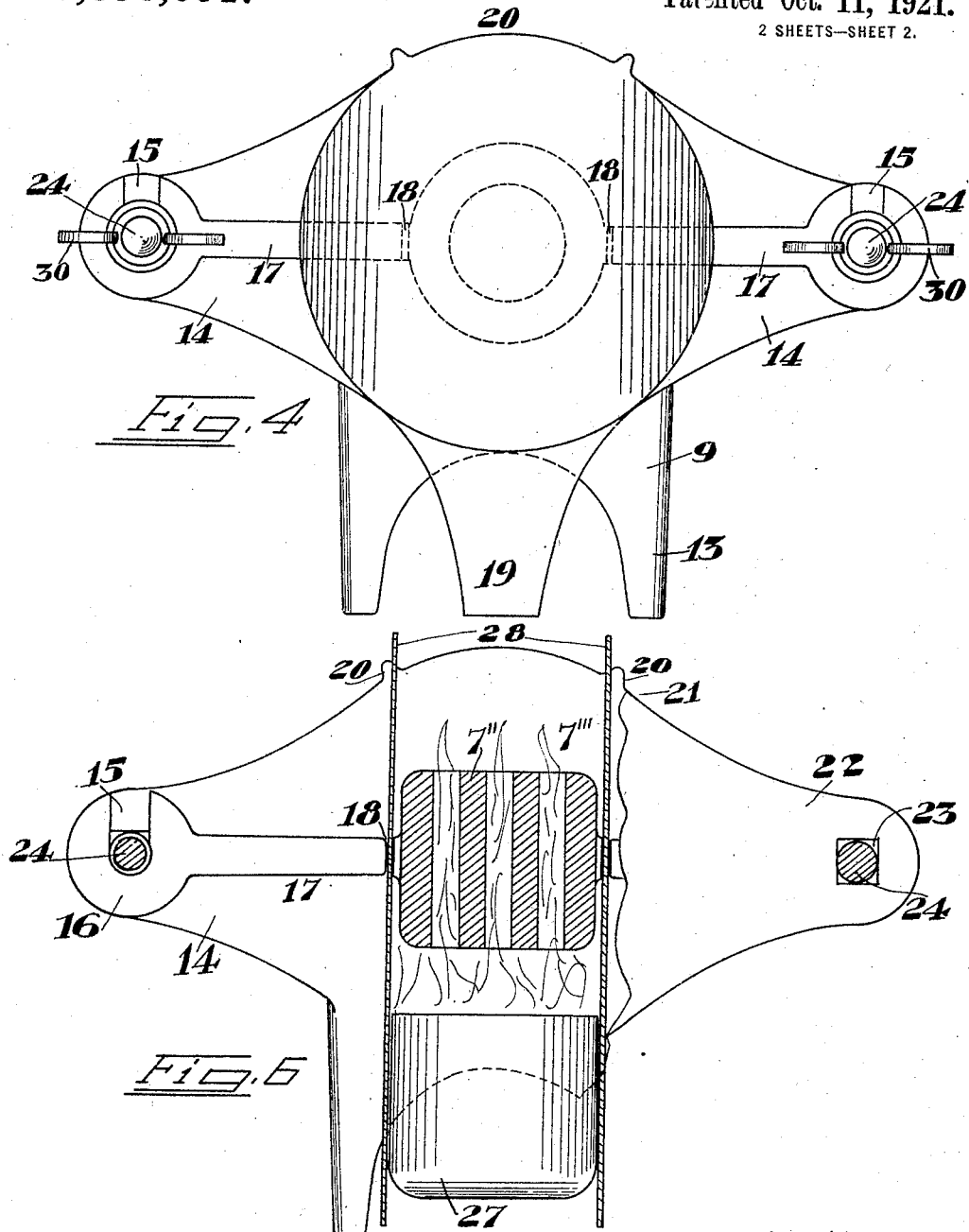

UNITED STATES PATENT OFFICE.

POWEL CROSLEY, JR., OF CINCINNATI, OHIO.

VULCANIZER.

1,393,091.  Specification of Letters Patent.  Patented Oct. 11, 1921.

Application filed March 22, 1920. Serial No. 367,914.

*To all whom it may concern:*

Be it known that I, POWEL CROSLEY, Jr., a citizen of the United States, residing at Cincinnati, in the county of Hamilton and State of Ohio, have invented certain new and useful Improvements in Vulcanizers, of which the following is a specification.

My invention relates in general to devices for vulcanizing rubber and more particularly to means which are adapted to be employed for repairing pneumatic tires, inner tubes, and the like.

Heretofore, vulcanizing devices have been constructed in cup formation, the bottom of which does the vulcanizing, the heat being communicated through the outer wall of the cup to the circumference of the vulcanizing face, and thence to the center of the vulcanizing face, so that the center of the vulcanizing face is usually cooler than the circumference, thereby causing the patch to cure more slowly than the surrounding surface of the old rubber (which does not need curing) but which by the use of such device, becomes over-cured. Such devices usually waste a great quantity of fuel, as the rapid vaporizing of the gasolene, itself, holds down the temperature at the center of the combustion cup, meaning that a considerably greater volume of gasolene must be consumed in order to heat the outer wall of the cup so that the heat will travel inwardly therethrough to the center of the vulcanizing face after the flame has gone out.

The objects of my invention are to overcome these objections by conveying the heat directly to the center of the vulcanizing face from which it is radiated outwardly toward the circumference thereof, thereby applying the greater heat to the center of the vulcanizing face where it is most needed, and allowing the outer edges of the vulcanizing face to remain cooler than the center so that it will not double vulcanize or over-cure the rubber surface surrounding the patch; to render the equalizing device more efficient and economical, since practically all of the heat generated from the gasolene or other source of heat is absorbed by the heat absorbing and conveying bar, fins and vulcanizing plate; and to provide a vulcanizing device of simple and economical construction adapted to be conveniently used in repairing tire casings, inner tubes or other rubber structures easily, quickly and efficiently.

My invention consists in the details of construction and in the combination and arrangement of parts as herein set forth and claimed.

In the drawings:

Fig. 4 is a front elevation;

Fig. 6 is a vertical section showing another modification.

Figure 1:
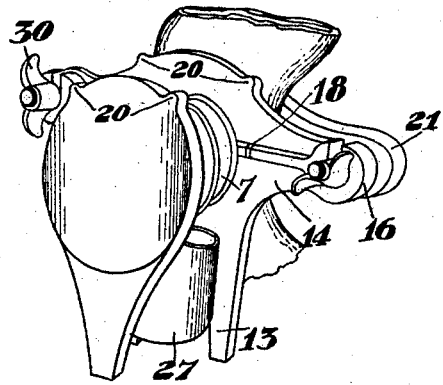
Figure 1 is a perspective view of the device showing a section of inner tube clamped in position to be vulcanized.

In the embodiment of my invention as illustrated and which shows preferred constructions, a heat absorbing and conveying bar 7 having fins or ridges 8 upon its periphery, is integrally connected at one end to one side of a vulcanizing plate 9, having a flat vulcanizing face 10 upon its opposite side, and at its other end to one side of a vulcanizing plate 11 having a concave vulcanizing face 12 upon its opposite side. Vulcanizing plate 9 is provided with support 13 and has laterally extending arms 14, each provided upon its upper side near the end, with a notch 15. A reinforcing boss 16 is preferably formed adjacent each notch 15 upon one side of each arm, and strengthening rib 17 extends inwardly therefrom to the bar 7 with a vertical groove 18 therethrough upon each side of and near said bar. Plate 11 is provided with support 19 and with holding ears 20. Plate 9 is also provided with similar holding ears 20. Clamping plate 21, having arms 22, each provided with a squared bolt hole 23 adapted to register with notches 15 respectively, is adapted to be mounted in position adjacent plate 11 by bolts 24 to clamp the inner tube 25 or other object and the rubber patch 26 in position to be vulcanized. A flexible metallic vessel 27 supplied with gasolene or other fuel is inserted between supports 13 and 19 and frictionally held in elevated position therebetween, upon each side of bar 7 between plates 9 and 11. An oblong sheet metal heat retaining strip 28 having wings 29 at its upper end is adapted to be inserted vertically between plates 9 and 11, one edge bearing against the wall of plate 11 and other edge engaging groove 18, with its wings 29 resting upon the ears 20 respectively.

When it is desired to repair an inner tube or other similar rubber structure which is capable of being clamped between two flat surfaces, first clean the surface of the rubber adjacent the part to be repaired, using benzin or gasolene, then apply rubber cement to said surface and to the surface of the patch to be applied, then place the patch in position, clamping it upon the vulcanizing face and centrally thereof with the object being repaired resting against the clamping plate, then clamp the parts tightly together by means of the thumb nuts 30, then place the heat retaining strips 28 in position, then light the gasolene or other fuel 31. The heat therefrom will pass upwardly around bar 7 which will absorb it and carry the same to the central part of plate 11 from which it will radiate outwardly thereby heating the member being repaired and the patch causing them to run together into a homogeneous structure. It will be seen that just enough gasolene or other fuel may be placed within the cup to properly heat the vulcanizing face and when the fuel is burned out, the bar 7 will retain the necessary heat to complete the vulcanizing of the parts after which the thumb nuts will be loosened, the clamp removed and the object repaired taken out ready for use.

Figure 2:
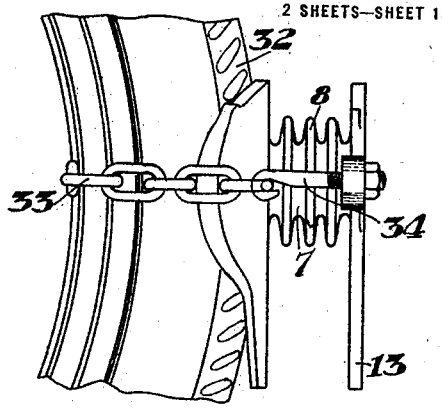
Fig. 2 is a side elevation of my device secured in position upon the outer casing of a pneumatic tire for the purpose of repairing it by vulcanizing a patch upon the defective part.

When it is desired to repair an outer casing, place the casing 32 in the position shown in Fig. 2 and secure it thereon by means of chain 33 connected at one end to an eye bolt and at the other end to a hook bolt 34 and clamp the parts together as shown, first cleaning and otherwise treating the parts as above described with reference to repairing an inner tube. The heat will then be applied by inserting the fuel cup in the position shown in Fig. 1, and heating bar 7 as above described will absorb and convey the heat to the concave vulcanizing face 12, causing the parts to vulcanize.

Figures 3, 5:
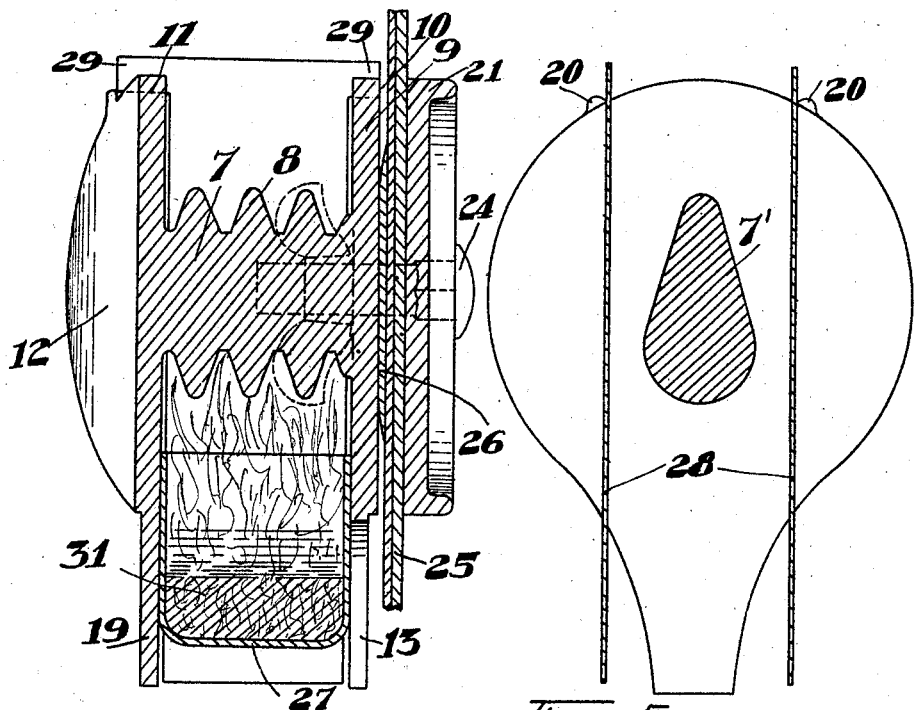
Fig. 3 is a central vertical section showing an inner tube being vulcanized.
Fig. 5 is a vertical section showing a modification.

It will be apparent that my invention is capable of some modification without material departure from its scope or spirit, as for instance, the heat absorbing and conveying bar may be formed in the shape shown in Fig. 5, in which the bar 7' is formed in the shape of a tapering or inverted wedge from its lower to its upper extremity, or it may be formed as shown in Fig. 6 where the bar 7" is provided with a series of holes 7''' to allow the heat to pass upwardly therethrough and more quickly heat said bar.

Having thus described my invention and the manner in which it is to be used, what I claim as new and desire to secure by Letters Patent is:

1. In a vulcanizer, a vulcanizing plate having a plurality of vulcanizing faces, a heat absorbing and conveying bar integrally connecting said vulcanizing faces, means for heating said bar and means for clamping the object to be vulcanized and the vulcanizing material on one of said vulcanizing faces.

2. In a vulcanizer, a vulcanizing plate having a vulcanizing face, a bar integrally connected to said vulcanizing plate, supports for said vulcanizing plate and bar and a flexible metallic cup adapted to be frictionally held between said supports below said bar.

3. In a vulcanizer, a vulcanizing plate having a flat raised vulcanizing face and having a downwardly extending support and laterally extending arms each having a notch near its end, a vertically disposed vulcanizing plate having a concave raised vulcanizing face and having a downwardly extending support, said plates each having ears upon its upper end and said flat plate having vertically disposed notches below the ears and a heat absorbing and conveying bar integrally connecting said vulcanizing plates centrally and in the rear of said vulcanizing faces, means for heating said bar, means for confining the heat and means for clamping an object to be vulcanized upon either of said vulcanizing faces.

4. In a vulcanizer, a vulcanizing plate having a flat vulcanizing face, a vulcanizing plate having a concave vulcanizing face, a heat absorbing and conveying bar integrally connected to each of said vulcanizing plates, means for heating said bar, and means for clamping the object to be vulcanized and the vulcanizing material upon either of said vulcanizing faces.

5. In a vulcanizer, a vulcanizing plate having a flat vulcanizing face, a vulcanizing plate having a concave vulcanizing face, a heat absorbing and conveying bar having fins thereon, means for heating said bar and fins, means for confining the heat while it is being generated and absorbed and means for clamping the object being vulcanized and the vulcanizing material in position for vulcanizing upon either of said vulcanizing faces.

6. In a vulcanizer, a vulcanizing plate having a flat vulcanizing face, a vulcanizing plate having a concave vulcanizing face, a bar integrally connected to each of said vulcanizing plates, one of said vulcanizing plates having notches near and upon each side of said bar, a flexible metallic cup adapted to be frictionally held between said plates in elevated position below said bar, heat confining strips each having wings adapted to rest upon said ears or in said depressions and to engage said notches, means for clamping the object to be vulcanized upon either of said vulcanizing faces, and means in said cup for supplying heat to said heat absorbing and conveying bar.

POWEL CROSLEY, Jr.